(12) United States Patent
Laughlin

(10) Patent No.: US 6,665,461 B1
(45) Date of Patent: Dec. 16, 2003

(54) TOTAL INTERNAL REFLECTION OPTICAL SWITCH AND METHOD OF OPERATING THE SAME

(76) Inventor: Richard H. Laughlin, 5063 County Rd. 265, Collinsville, TX (US) 76233

( * ) Notice: Subject to any disclaimer, the term of this patent is extended or adjusted under 35 U.S.C. 154(b) by 190 days.

(21) Appl. No.: 09/826,455

(22) Filed: Apr. 5, 2001

(51) Int. Cl.[7] .................................................. G02B 6/35
(52) U.S. Cl. ............................ 385/18; 385/17; 359/222
(58) Field of Search .............................. 385/20, 21, 36, 385/33, 15–18, 25, 31; 359/211, 222

(56) References Cited

U.S. PATENT DOCUMENTS

| 2,565,514 A | 8/1951 | Pajes |
| 2,997,922 A | 8/1961 | Kaprelian |
| 3,338,656 A | 8/1967 | Astheimer |
| 3,514,183 A | * 5/1970 | Rabedeau ................ 359/222 |
| 3,559,101 A | 1/1971 | Parker |
| 3,611,436 A | 10/1971 | Rigrod |
| 3,649,105 A | 3/1972 | Treuthart |
| 3,711,791 A | 1/1973 | Erickson |
| 3,716,804 A | 2/1973 | Groschwitz |
| 4,208,094 A | 6/1980 | Tomlinson, III et al. |
| 4,303,303 A | 12/1981 | Aoyama |
| 4,304,460 A | 12/1981 | Tanaka |
| 4,322,126 A | 3/1982 | Minowa |
| 4,589,726 A | 5/1986 | Buhrer |
| 4,626,066 A | 12/1986 | Levinson |
| 4,927,225 A | 5/1990 | Levinson |
| 4,932,745 A | 6/1990 | Blonder |
| 5,000,534 A | 3/1991 | Watanabe |
| 5,042,889 A | 8/1991 | Benzoni |
| 5,221,987 A | 6/1993 | Laughlin |
| 5,225,690 A | * 7/1993 | Sakai et al. ............ 250/559.09 |
| 5,436,986 A | 7/1995 | Tsai |
| 5,444,801 A | 8/1995 | Laughlin |
| 5,555,327 A | 9/1996 | Laughlin |
| 5,555,558 A | 9/1996 | Laughlin |
| 5,566,260 A | 10/1996 | Laughlin |
| 5,647,033 A | 7/1997 | Laughlin |
| 5,841,916 A | 11/1998 | Laughlin |
| 5,875,271 A | 2/1999 | Laughlin |
| 5,909,301 A | 6/1999 | Laughlin |
| 5,917,641 A | 6/1999 | Laughlin |
| 6,463,192 B1 | * 10/2002 | Kapany ...................... 385/17 |

* cited by examiner

*Primary Examiner*—Hemang Sanghavi
*Assistant Examiner*—Sarah N Song

(57) ABSTRACT

Novel architectures of optical switches and N×N cross bar optical switches are disclosed. In one embodiment, an optical switch includes: (1) a primary refracting body having a total internal reflecting surface and capable of transmitting optical energy therethrough, (2) a frustrating refracting body having a frustrating surface located proximate the total internal reflecting surface and (3) an actuator, coupled to the primary refracting body and the frustrating refracting body, that drives at least a center portion of the frustrating refracting body thereby to frustrate a reflection of the total internal reflecting surface.

28 Claims, 4 Drawing Sheets

US 6,665,461 B1

TOTAL INTERNAL REFLECTION OPTICAL SWITCH AND METHOD OF OPERATING THE SAME

TECHNICAL FIELD OF THE INVENTION

The present invention is directed, in general, to optical switches and, more specifically, to a total internal reflection (TIR) optical switch and method of operating the switch to selectively guide beams of light.

BACKGROUND OF THE INVENTION

In today's rapidly expanding optical network, a critical need exists for a fast reversing optical bypass switch to redirect an optical signal from one path to another. Optical switches of this type find use in a network having a number of communication nodes connected sequentially to form a ring, one or more nodes may require temporary removal from the network. To achieve this removal, the optical fibers interconnecting the network must be able to "switch" the node(s) from an active (transmit/receive) state to a passive (bypass) state. Optical switches of this type find further use in wavelength division multiplexing (WDM) transmission systems, in which a need exists for add/drop switches to add and drop traffic along the route.

Currently, several different technologies are used to make optical fiber switches (exclusive of the integrated optical switch). One technology is known as "moving fiber." In this technology, either the input optical fibers, the output optical fibers, or both, are physically moved relative to one another to switch the light path between outputs.

Another technology is known as "moving prism" or "moving mirror." In this technology, a refractive or reflective medium (i.e., a prism or a mirror) positioned in the optical path between input and output optical fibers is reoriented to switch the light path between outputs; the fibers themselves do not move.

Examples of moving prism optical switches are set forth in U.S. Pat. Nos. 2,565,514; 4,303,303; 4,322,126; 4,589,726; 4,927,225 (which employs a gradient index of refraction, or GRIN, lens to bend the light path); and 5,647,033. Examples of moving mirror optical switches are set forth in U.S. Pat. Nos. 3,611,436; 3,716,804; 4,208,094; 4,304,460; 4,626,066; 4,932,745; 5,000,534; 5,042,889; 5,221,987; 5,436,986; 5,444,801; 5,555,558; 5,566,260; and 5,875,271.

Still other technologies employ liquid crystal, bubble or micro-electromechanical systems (MEMS) switches to switch light paths. Examples of such optical switches will not be set forth here.

In contrast to the above-described technologies, frustrated total internal reflection (FTIR) switching technology provides a virtual solid state optical switching ability that overcomes the limitations of the previously listed switches.

FTIR optical switches, in general, go back to at least 1947. In almost all cases, FTIR optical switch designs feature an air gap between two solid bodies of similar material. A disparate index of refraction caused by the air gap produces total internal reflection in the bodies. By various mechanical means, a movable one of the two bodies of material (called the "switch plate") is selectively moved toward the other of the two bodies to drive the air gap between the two bodies to less than $1/10^{th}$ of a wavelength (of the light to be switched) in thickness. This frustrates the total internal reflection in the other of the two bodies, changes the optical path in the other of the two bodies, and lends the technology its name.

Unfortunately, In many of these conventional FTIR optical switches, the reflection does not go to zero, a fact that most corresponding patents acknowledge. Examples of conventional FTIR optical switch designs suffering these disadvantages are found in U.S. Pat. Nos. 2,997,922; 3,338.656; 3,376,092; 3,514,183; 3,559,101; 3,649,105; and 4,249,814. Although these patents fail to address the underlying reason why, all of these FTIR optical switches have difficulty closing the gap to less than $1/10^{th}$ wavelength.

U.S. Pat. Nos. 5,221,987; 5,555,327 and 5,909,301 purport that the problem in closing the air gap to less than $1/10^{th}$ wavelength is caused by air being trapped in the air gap, owing to the rate at which the air gap is closed during operation of the optical switch. As a result, these patents teach that, by forming the switch plate of a thin material and exerting a peel force to lift the edges of the switch plate first, less force is required than the shear force that would otherwise be required to lift the switch plate all at once.

Despite all efforts to the contrary, the problem of closing the air gap inexplicably remains in FTIR optical switches employing peel-force thin switch plates. What is needed in the art is a recognition of what is causing the problem of closing the air gap reliably. What is needed in response to that recognition is a fundamentally different structure for a TIR optical switch that reliably closes and opens its air gap to switch optical signals reliably. What is further needed in the art is a wholly new reversing optical switch architecture.

SUMMARY OF THE INVENTION

It has been discovered that the failure to close the air gap to less than $1/10^{th}$ wavelength is caused by surface irregularities and transient dimpling due to uneven application of force to a thin switch plate, which causes the switch plate to deform transiently. The deformation usually takes the form of dimpling. Though transient, the dimpling remains long enough to hamper suitably high speed switching.

Thin switch plates are subject to deformation due to shock waves created as they are suddenly moved. Shock waves, particularly those created at the edge of a switch plate, cause transient deformations that, in turn, causes a gap that results in a transient partial reflection, from the interface. In the case of U.S. Pat. No. 5,909,301, the gap is in the center, the active area of the switch. Many of the above-described FTIR optical switches drive in such a manner that the shockwave produced by the transducer reaches the outer edges before reaching the center. This causes a gap to form at the center and hinders closing of the optical switch.

To address these and other deficiencies of the prior art, the present invention provides novel architectures of optical switches and N×N cross bar optical switches. In one embodiment, an optical switch constructed according to the principles of the present invention includes: (1) a primary refracting body having a total internal reflecting surface and capable of transmitting optical energy therethrough, (2) a frustrating refracting body having a frustrating surface located proximate the total internal reflecting surface and (3) an actuator, coupled to the primary refracting body and the frustrating refracting body, that drives at least a center portion of the frustrating refracting body. In another embodiment, the actuator can drive the frustrating refracting body between (1) an open state, in which a collimated beam emanating from the first collimating lens reflects off the total internal reflecting surface and travels toward the second collimating lens, and (2) a closed state, in which the collimated beam emanating from the first collimating lens reflects off the angled mirror and travels back toward the first collimating lens.

The present invention introduces the broad concept of providing an optical switch in which opposing optical beams are launched at each other and selectively reflected by the total internal reflecting surface associated with the primary refracting body or the mirror associated with the frustrating refracting body. The actuation, which reduces the total internal reflection of the total internal reflecting surface, changes the path such that the input optical beams are reflected almost back upon themselves to the collimating lens that launched them.

In one embodiment of the present invention, actuation of the center portion of the frustrating refract body initiates a shock wave in the frustrating refracting body that emanates outward from the center portion to edges thereof thereby to frustrate a reflection of the total internal reflecting surface. The total internal reflection can be reduced by a shock wave that propagates first to the center of the actuating refractor and then to its edges (in contrast with prior art shock waves). While driving from only the edges should be avoided, production of the shock wave is not an essential part of the present invention. If the actuator drives the center portion and the edges of the frustrating refracting body uniformly, a shock wave can be at least substantially reduced. Alternatively, if the actuator drives the frustrating refracting body at a lower velocity, a shock wave may not form at all.

In one embodiment of the present invention, the primary refracting body is composed of glass. Those skilled in the pertinent art will realize, however, that the primary refracting body can be composed of any appropriate transparent material.

In one embodiment of the present invention, the frustrating refracting body is composed of glass. Those skilled in the pertinent art will realize, however, that the frustrating refracting body can be composed of any appropriate transparent material.

In one embodiment of the present invention, the actuator is composed of a piezoelectric bimorph. Alternatively, the actuator may be a mechanical structure of suitable speed and precision.

In one embodiment of the present invention, the switch further includes: (1) a first collimating lens coupled to a surface of the main refractive body and (2) a first input fiber and a first output fiber coupled to the first collimating lens. In an embodiment to be illustrated and described, the switch further includes: (1) first and second collimating lenses coupled to respective surfaces of the main refractive body, (2) a first input fiber and a first output fiber coupled to the first collimating lens and (3) a second input fiber and a second output fiber coupled to the second collimating lens.

In alternative embodiments of the present invention, the actuator drives the frustrating refracting body from the open state to the closed state or from the closed state to the open state. Thus, the switch may be normally open or normally closed. In the embodiment to be illustrated and described, the switch is normally open and driven closed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
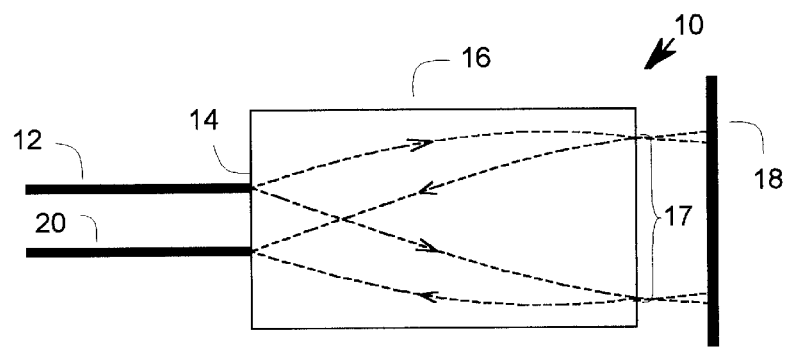
FIG. 1 illustrates an optical schematic of a prior art apparatus having a collimated beam from a lens reflected back upon itself.

Referring initially to FIG. 1, illustrated is an optical schematic of a prior art apparatus having a collimated beam from a lens reflected back upon itself. FIG. 1 is presented for the purpose of conveying basic optical principles of which the illustrated embodiment of the present invention takes advantage.

A first input fiber 12 provides a source of optical energy and terminates at a focal plane 14 of a first collimating lens 16 that collimates the optical energy emanating from the first input fiber into a collimated beam 17. The first collimating lens 16 is illustrated as being a gradient index of refraction (GRIN) lens.

The collimated beam 17 impinges upon and is reflected from a mirror 18 at mutually dependent angles and returned to the first collimating lens 16. The first collimating lens 16 focuses the optical energy onto a first output fiber 20 terminating at the focal plane 14 of the first collimating lens 16. The first output fiber 20 serves as a receptor for the optical energy. By this process, the optical energy has been transferred from the first input fiber 12 to the first output fiber 20.

Figure 2:
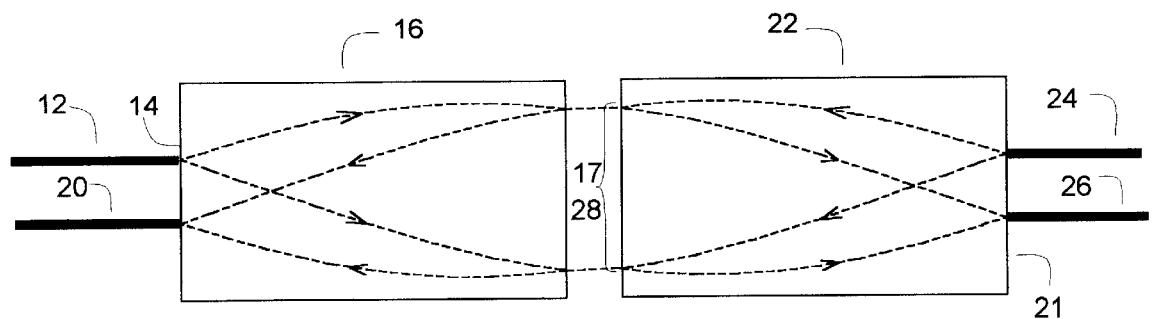
FIG. 2 illustrates an optical schematic of a prior art apparatus having a pair of fibers connected to a second pair of fibers with two collimating lenses.

Turning now to FIG. 2, illustrated is an optical schematic of a prior art apparatus having a pair of fibers connected to a second pair of fibers with two collimating lenses. Like FIG. 1, FIG. 2 is presented for the purpose of conveying basic optical principles of which the illustrated embodiment of the present invention takes advantage.

FIG. 2 shows the first input fiber 12, again providing a source of optical energy and terminating at the focal plane 14 of the collimating lens 16. As before, the collimating lens 16 collimates the optical energy emanating from the first input fiber 12 into the collimated beam 17. However, in contrast to FIG. 1, the collimated beam 17 is projected instead into a second collimating lens 22. The second collimating lens 22 focuses the collimated beam 17 onto a second output fiber 26 that terminates at a focal plane 21 of the second collimating lens 22. The second output fiber 26 serves as a receptor for the optical energy. By this process, the optical energy has been transferred from the first input fiber 12 to the second output fiber 26.

Opposing optical energy is introduced at a second input fiber 24 terminating at the focal plane 21 of the second collimating lens 22. The second collimating lens 22 collimates the optical energy emanating from the second input fiber 24 into a beam 28. The collimated beam 28 is projected into the first collimating lens 16, which, in turn, focuses the energy onto the first output fiber 20. The first output fiber 20 serves as a receptor for the optical energy. By this process, the optical energy has been transferred from the second input fiber 24 to the first output fiber 20.

Figure 3:
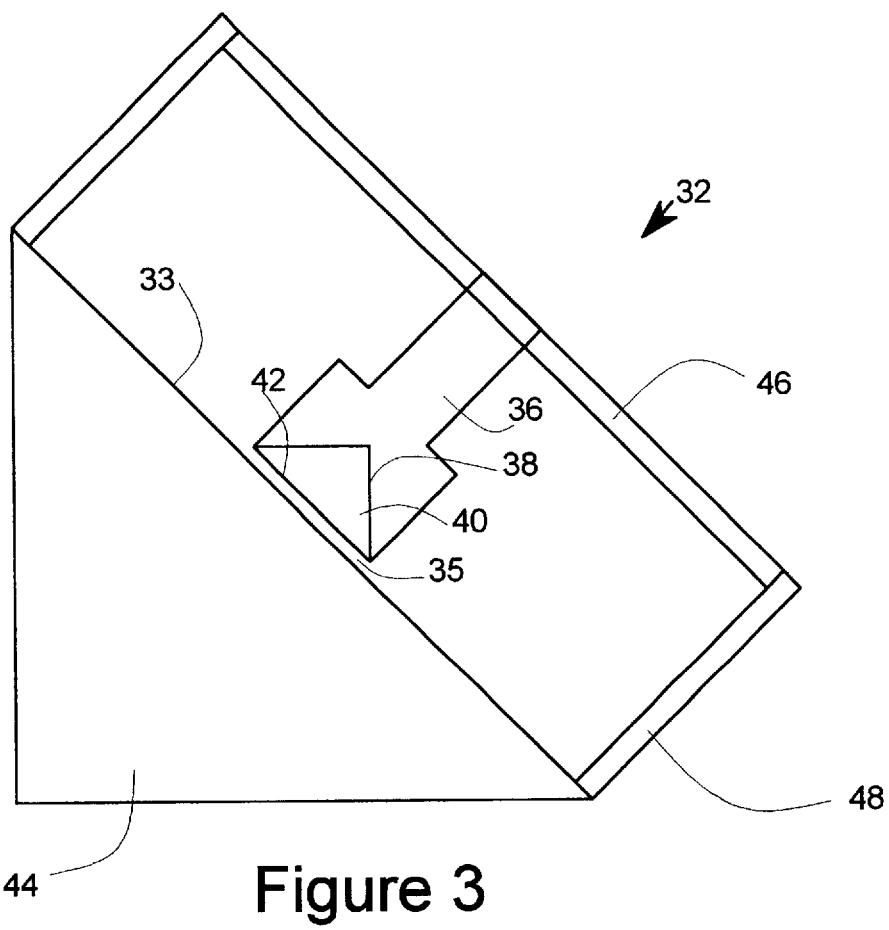
FIG. 3 illustrates a TIR optical switch constructed according to the principles of the present invention.

Turning now to FIG. 3, illustrated is a TIR optical switch, generally designated 32, constructed according to the principles of the present invention. The TIR optical switch 32 has a first spacer 48 and a second spacer 36 that cooperate to separate an actuator 46 from a primary refracting body 44. It is advantageous (and in the illustrated embodiment, important) that the first spacer 48 have essentially the same coefficient of expansion as the second spacer 36.

In the illustrated embodiment, the first and second spacers 48,36 are composed of glass or ceramic. The actuator 46 in the illustrated embodiment is a piezoelectric bimorph.

When an electrical impulse voltage is applied to the actuator 46, a center portion (not separately referenced, but adjoining the second spacer 36) of the actuator 46 is deflected toward the primary refracting body 44. In the preferred embodiment, the electrical impulse has a rapid rise time (less than 20 microseconds).

Deflection of the center portion of the actuator 46 may generate a shock wave (not shown) that travels through the second spacer 36 and drives a frustrating refracting body 40 toward the primary refracting body 44. If generated, the shock wave propagates through the frustrating refracting body 40, causing a frustrating surface 42 of the frustrating refracting body 40 to move from an initial position greater than one wavelength from a first total internal reflecting surface 33 of the primary refracting body 44 to a subsequent position less than $1/10^{th}$ of a wavelength from the first total internal reflecting surface 33.

By driving the frustrating refracting body 40 from its center, as opposed to its edge, the shock wave reaches the center of the frustrating refracting body 40 before, or at essentially the same time as, it reaches the edge of the frustrating refracting body 40. This orderly, outward progression of the shock wave essentially eliminates the indentation in the center of the frustrating refracting body 40 which, in the past, caused a transient deformation 35 at the center of the frustrating refracting body 40. Minimization or absence of the transient deformation minimizes or eliminates transient optical reflection after closing.

It is recognized that many different mechanical arrangements exist to facilitate the shock wave arriving at the center, and thus the motion first occurring at the center of the frustrating surface 42 of the frustrating refracting body 40 prior to reaching the edges of the frustrating surface 42 of the frustrating refracting body 40.

It should be noted that, in alternative embodiments, the actuator 46 drives the frustrating refracting body 40: (1) uniformly, at least substantially reducing any shock wave that may form or (2) at a lower velocity, again reducing or eliminating any shock waves. Thus, a shock wave is initiated only in the illustrated embodiment, and not in all embodiments of the present invention. Those skilled in the pertinent art will further recognize that many different mechanical arrangements exist to drive the frustrating refracting body 40 uniformly or at a lower velocity.

The body of the frustrating refracting body 40 is transparent, such that light can travel through it. Mirrors 34, 38 are located on the frustrating refracting body 40. The mirrors 34, 38 are formed of two flat mirror surfaces oriented essentially normal to the direction of the optical axes of the first and second collimating lenses 16, 22. In the illustrated embodiment, the mirrors 34, 38 are composed of enhanced silver, although those skilled in the pertinent art will realize that other materials fall within the broad scope of the present invention.

Figure 4:
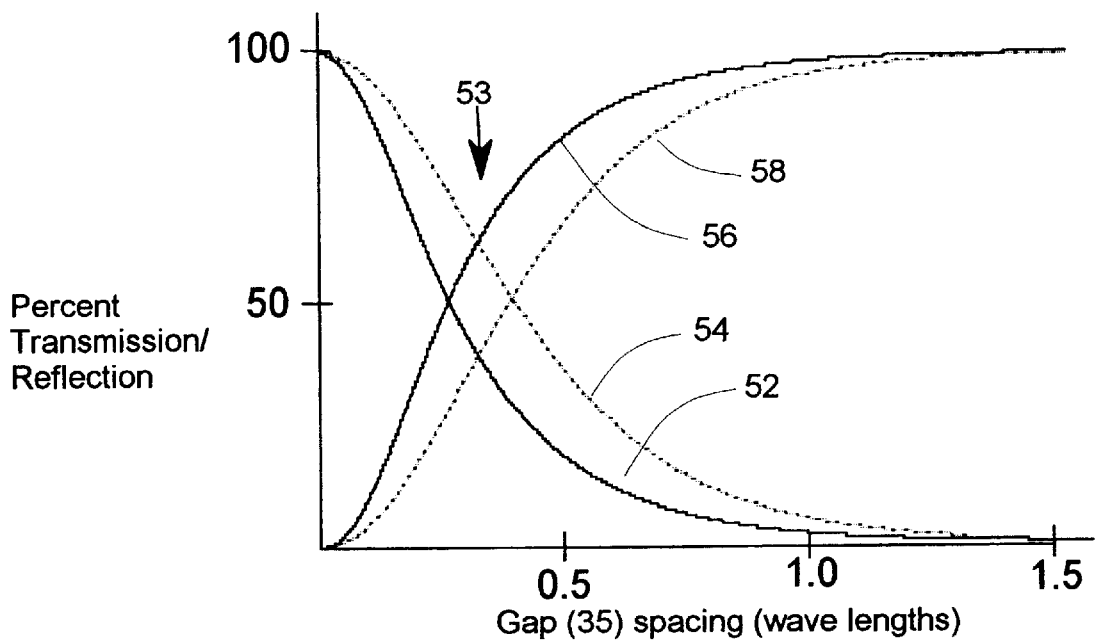
FIG. 4 illustrates a graphical representation of reflection and transmission at a TIR interface constructed according to the principles of the present invention as a function of spacing.

Turning now to FIG. 4, illustrated is a graphical representation of reflection and transmission at a TIR interface constructed according to the principles of the present invention as a function of spacing. Shown are curves corresponding to: (1) transmission of optical energy in the plane of incidence Tp (curve 52), (2) transmission of optical energy perpendicular to the plane of incidence Ts (curve 54), (3) reflection of optical energy in the plane of incidence Rp (curve 56) and (4) reflection of optical energy perpendicular to the plane of incidence Rs (curve 58).

FIG. 4 well illustrates how an air gap of $1/10^{th}$ of a wavelength or less yields substantial transmission and negligible reflection and how an air gap of more than a full wavelength yields negligible transmission and substantial reflection. FIG. 4 also illustrates an intermediate region 53 in which transmission and reflection occur more or less concurrently. The optical switch of the present invention can be driven to operate in this region as well, allowing multiple output light beams (of controllable relative intensity, no less) to be selectively spawned from a single input light beam.

Figure 5A:
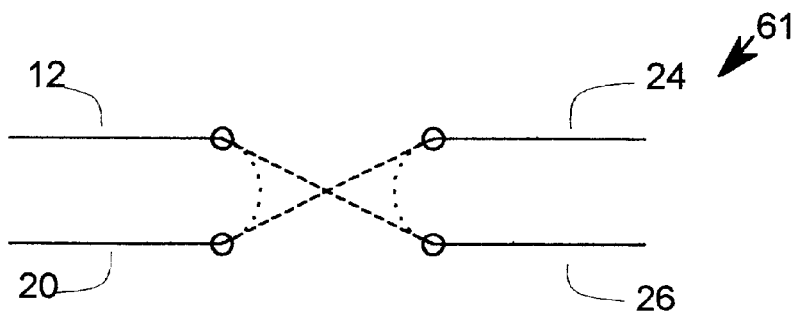
FIGS. 5A and 5B together illustrate optical schematics of the TIR reversing switch of FIGS. 3 and 7.
Figure 5B:
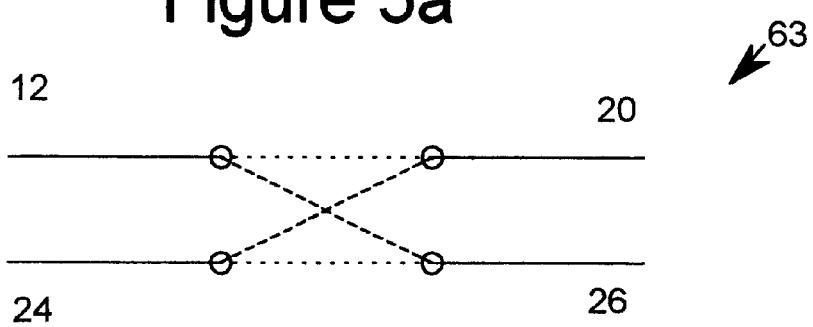

Turning concurrently now to FIGS. 5A and 5B, illustrated are optical schematics of the TIR reversing switch 32 of FIG. 3. The switch is illustrated in two configurations as a switch 61 and a switch 63, respectively.

Regarding FIG. 5A, optical energy is initially routed from the first input fiber 12 to the first output fiber 26. Optical energy is also initially routed from the opposing second fiber input 24 to the second fiber output 20. Upon actuation, optical energy is reversed, and instead routed from the first fiber input 12 to the second output fiber 20. Likewise, optical energy is instead routed from the second input fiber 24 to the first fiber output 26. The common name for this TIR reversing switch 61 is a 2×2 reversing bypass switch 61.

FIG. 5B illustrates the same switch, made to function as a 2×2 cross bar switch 63. Optical energy is initially routed from the first input fiber 12 to the first output fiber 26. Optical energy is also initially routed from the second input fiber 24 to the second output fiber 20. Upon actuation, optical energy is reversed and instead routed from the first fiber input 12 to the second output fiber 20. Likewise, optical energy is instead routed from the second input fiber 24 to the second fiber output 26.

Figure 6:
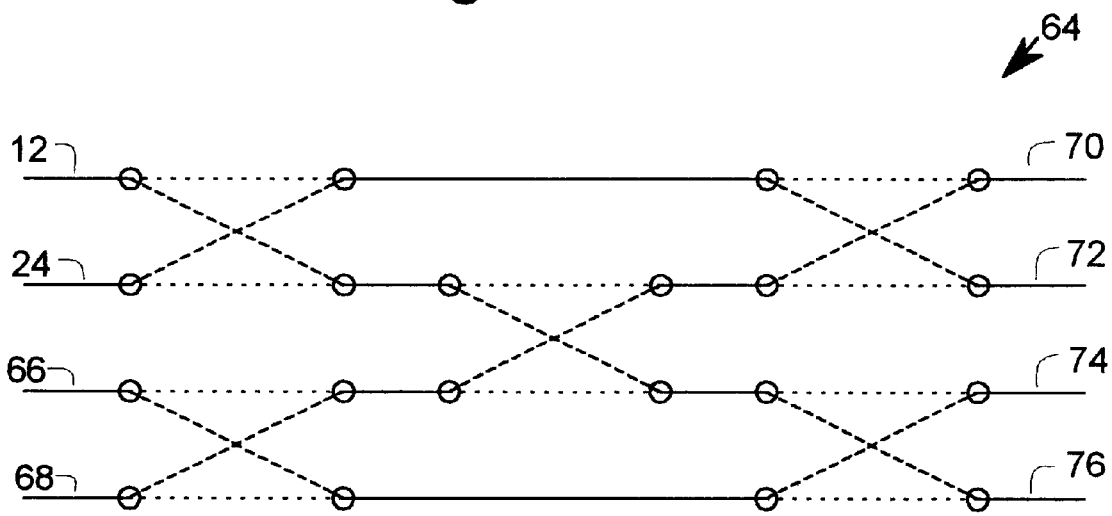
FIG. 6 illustrates an N×N cross bar switch composed of multiple TIR reversing switches and constructed according to the principles of the present invention.

Turning now to FIG. 6, illustrated is an N×N (specifically a 4×4) cross bar switch composed of multiple TIR reversing optical switches and constructed according to the principles of the present invention. FIG. 6 shows six TIR reversing optical switches (not separately referenced) configured as 2×2 cross bar switches to yield a 4×4 cross bar switch, generally referenced as 64. Each of several input fibers 12, 24, 66, 68 can be connected to any of several output fibers 70, 72, 74, 76. It is apparent that greater numbers of TIR reversing optical switches can be cascaded in like manner to form an optical switch of arbitrarily large (N×N) size.

Figure 7:
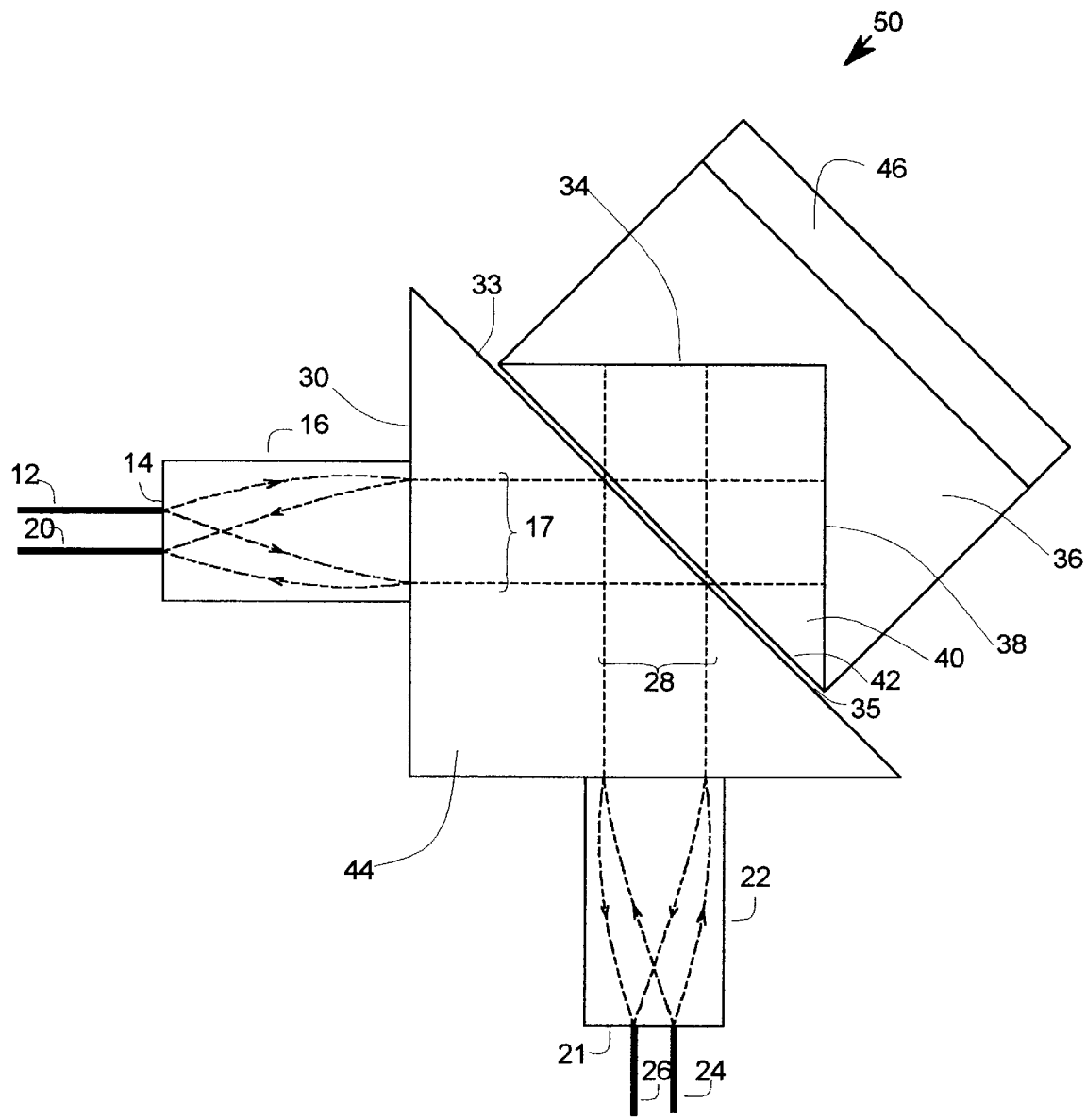
FIG. 7 illustrates a TIR reversing optical switch constructed according to the principles of the present invention.

FIG. 7 illustrates a TIR reversing optical switch, generally referenced as 50, constructed according to the principles of the present invention. FIG. 7 will be initially described assuming that the TIR reversing switch 50 is in an open state, the air gap 35 being perhaps on the order of one and a half wavelengths in thickness.

The first input fiber 12 provides a source of optical energy and terminates at the focal plane 14 of the collimating lens 16. The collimating lens 16 collimates the optical energy emanating from the first input fiber 12 into a beam 17. By virtue of the physical phenomenon of total internal reflection, the collimated beam 17 is reflected off of the first total internal reflecting surface into a second collimating lens 22. The second collimating lens 22 focuses the collimated beam 17 onto a second output fiber 26 that terminates at a focal plane 21 of the second collimating lens 22. The second output fiber 26 serves as a receptor for the optical energy. By this process, the optical energy has been transferred from the first input fiber 12 to the second output fiber 26.

Opposing optical energy is introduced at a second input fiber 24 terminating at the focal plane 21 of the second collimating lens 22. The second collimating lens collimates the optical energy emanating from the second input fiber 24 into a beam 28. The collimated beam 28 is reflected off of the first total internal reflecting surface 33 into the first collimating lens 16, which, in turn, focuses the energy onto the first output fiber 20. The first output fiber 20 serves as a receptor for the optical energy. By this process, the optical energy has been transferred from the second input fiber 24 to the first output fiber 20.

Now FIG. 7 will be described assuming that the TIR reversing switch 50 is in a closed state, the air gap 35 being perhaps less than $1/10^{th}$ of a wavelength in thickness. The first input fiber 12 provides a source of optical energy and terminates at the focal plane 14 of the first collimating lens 16 that collimates the optical energy emanating from the first input fiber 12 into a beam 17.

The air gap 35 having substantially closed and the reflection of the first total internal reflecting surface 33 having been frustrated, the collimated beam 17 passes through the interface defined by the first total internal reflecting surface 33 and the frustrating surface 42 of the frustrating refracting body 40. The collimated beam 17 then impinges upon and is reflected from a mirror 38 formed on or proximate the frustrating refracting body 40 (though not shown, the mirror 38 may be stood-off from a backside of the frustrating refracting body 40 without materially changing the beam-reversing function of the mirror 38). The collimated beam 17 then passes back through the interface defined by the first total internal reflecting surface 33 and the frustrating surface 42 and returns to the first collimating lens 16. The first collimating lens 16 focuses the optical energy onto the first output fiber 20. By this process, the optical energy has been transferred from the first input fiber 12 to the first output fiber 20.

In like fashion, the second input fiber 12 provides an opposing source of optical energy and terminates at the focal plane 21 of the second collimating lens 22 that collimates the optical energy emanating from the second input fiber 24 into a collimated beam 28.

The air gap 35 again having substantially closed and the reflection of the first total internal reflecting surface 33 frustrated, the collimated beam 28 passes through the interface defined by the first total internal reflecting surface 33 and the frustrating surface 42 of the frustrating refracting body 40. The collimated beam 28 then impinges upon and is reflected from the mirror 34. The collimated beam 28 then passes back through the interface defined by the first total internal reflecting surface 33 and the frustrating surface 42 and returns to the second collimating lens 22. The first collimating lens 22 focuses the optical energy onto the second output fiber 26. By this process, the optical energy has been transferred from the second input fiber 24 to the second output fiber 26.

From the above, it is apparent that the present invention provides novel architectures of optical switches and N×N cross bar optical switches. In one embodiment, an optical switch includes: (1) a primary refracting body having a total internal reflecting surface and capable of transmitting optical energy therethrough, (2) a frustrating refracting body having a frustrating surface located proximate the total internal reflecting surface and (3) an actuator, coupled to the primary refracting body and the frustrating refracting body, that drives at least a center portion of the frustrating refracting body thereby to frustrate a reflection of the total internal reflecting surface. In another embodiment, the actuator can drive the frustrating refracting body from an open state, in which a collimated beam emanating from the first collimating lens reflects off the total internal reflecting surface and travels toward the second collimating lens, to a closed state, in which the collimated beam emanating from the first collimating lens reflects off the mirror and travels back toward the first collimating lens.

Although the present invention has been described in detail, those skilled in the art should understand that they can make various changes, substitutions and alterations herein without departing from the spirit and scope of the invention in its broadest form.

What is claimed is:

1. An optical switch, comprising:
   a primary refracting body having a total internal reflecting surface and capable of transmitting optical energy therethrough;
   first and second collimating lenses coupled to respective surfaces of said primary refracting body;
   a frustrating refracting body located proximate said total internal reflecting surface and having a mirror; and
   an actuator, coupled to said primary refracting body and said frustrating refracting body, that drives said frustrating refracting body between an open state, in which a collimated beam emanating from said first collimating lens reflects off said total internal reflecting surface and travels toward said second collimating lens, and a closed state, in which said collimated beam emanating from said first collimating lens reflects off said mirror and travels back toward said first collimating lens.

2. The switch as recited in claim 1 wherein said actuator drives said frustrating refracting body from said open state to said closed state.

3. The switch as recited in claim 1 herein said actuator drives said frustrating refracting body from said closed state to said open state.

4. The switch as recited in claim 1 further comprising:
   a first input fiber and a first output fiber coupled to said first collimating lens; and
   a second input fiber and a second output fiber coupled to said second collimating lens.

5. The switch as recited in claim 1 wherein said primary refracting body is composed of glass.

6. The switch as recited in claim 1 wherein said frustrating refracting body is composed of glass.

7. The switch as recited in claim 1 wherein said actuator is composed of a piezoelectric bimorph.

8. The switch as recited in claim 1 wherein said mirror is composed of enhanced silver.

9. The switch as recited in claim 1 wherein said actuator drives said frustrating refracting body to an intermediate state in which a collimated beam emanating from said first collimating lens partially reflects off said total internal reflecting surface and travels toward said second collimating lens and partially reflects off said mirror and travels back toward said first collimating lens.

10. An N×N cross bar switch, comprising:
a cascaded plurality of interconnected optical switches yielding N optical fiber inputs and N optical fiber outputs, each of said cascaded plurality of interconnected optical switches including:
a primary refracting body having a total internal reflecting surface and capable of transmitting optical energy therethrough,
a frustrating refracting body having a frustrating surface located proximate said total internal reflecting surface, wherein said frustrating refracting body is composed of glass, and
an actuator, coupled to said primary refracting body and said frustrating refracting body, that drives at least a center portion of said frustrating refracting body thereby to reduce an indentation in said frustrating surface and frustrate a reflection of said total internal reflecting surface.

11. The switch as recited in claim 10 wherein said actuator initiates a shock wave in said frustrating refracting body that emanates outward from said center portion to edges thereof.

12. The switch as recited in claim 10 wherein said primary refracting body is composed of glass.

13. The switch as recited in claim 10 wherein said actuator is composed of a piezoelectric bimorph.

14. The switch as recited in claim 10 further comprising:
a first collimating lens coupled to a surface of said primary refracting body; and
a first input fiber and a first output fiber coupled to said first collimating lens.

15. The switch as recited in claim 10 further comprising:
first and second collimating lenses coupled to respective surfaces of said primary refracting body;
a first input fiber and a first output fiber coupled to said first collimating lens; and
a second input fiber and a second output fiber coupled to said second collimating lens.

16. The switch as recited in claim 10 wherein said actuator drives said at least said center portion of said frustrating refracting body to a position that only partially frustrates said reflection of said total internal reflecting surface.

17. The switch as recited in claim 10 wherein said frustrating refracting body comprises a mirror.

18. An N×N cross bar switch, comprising:
a cascaded plurality of interconnected optical switches yielding N optical fiber inputs and N optical fiber outputs, each of said cascaded plurality of interconnected optical switches including:
a primary refracting body having a total internal reflecting surface and capable of transmitting optical energy therethrough,
a frustrating refracting body having a frustrating surface located proximate said total internal reflecting surface, and
an actuator, coupled to said primary refracting body and said frustrating refracting body, that drives at least a center portion of said frustrating refracting body thereby to reduce an indentation in said frustrating surface and frustrate a reflection of said total internal reflecting surface, wherein said actuator is composed of a piezoelectric bimorph.

19. An N×N cross bar switch, comprising:
a cascaded plurality of interconnected optical switches yielding N optical fiber inputs and N optical fiber outputs, each of said cascaded plurality of interconnected optical switches including:
a primary refracting body having a total internal reflecting surface and capable of transmitting optical energy therethrough,
a frustrating refracting body having a frustrating surface located proximate said total internal reflecting surface, and
an actuator, coupled to said primary refracting body and said frustrating refracting body, that drives at least a center portion of said frustrating refracting body to a position thereby to reduce an indentation in said frustrating surface and only partially frustrate a reflection of said total internal reflecting surface.

20. An N×N cross bar switch, comprising:
a cascaded plurality of interconnected optical switches yielding N optical fiber inputs and N optical fiber outputs, each of said cascaded plurality of interconnected optical switches including:
a primary refracting body having a total internal reflecting surface and capable of transmitting optical energy therethrough,
a frustrating refracting body having a frustrating surface located proximate said total internal reflecting surface, wherein said frustrating refracting body comprises a mirror and
an actuator, coupled to said primary refracting body and said frustrating refracting body, that drives at least a center portion of said frustrating refracting body thereby to reduce an indentation in said frustrating surface and frustrate a reflection of said total internal reflecting surface.

21. An N×N cross bar switch, comprising:
a cascaded plurality of interconnected optical switches yielding N optical fiber inputs and N optical fiber outputs, each of said cascaded plurality of interconnected optical switches including:
a primary refracting body having a total internal reflecting surface and capable of transmitting optical energy therethrough,
first and second collimating lenses coupled to respective surfaces of said primary refracting body,
a frustrating refracting body located proximate said total internal reflecting surface and having a mirror, and
an actuator, coupled to said primary refracting body and said frustrating refracting body, that drives said frustrating refracting body between an open state, in which a collimated beam emanating from said first collimating lens reflects off said total internal reflecting surface and travels toward said second collimating lens, and a closed state, in which said collimated beam emanating from said first collimating lens reflects off said mirror and travels back toward said first collimating lens.

22. The switch as recited in claim 21 wherein said actuator drives said frustrating refracting body from said open state to said closed state.

23. The switch as recited in claim 21 wherein said actuator drives said frustrating refracting body from said closed state to said open state.

24. The switch as recited in claim 21 further comprising: a first input fiber and a first output fiber coupled to said first collimating lens; and a second input fiber and a second output fiber coupled to said second collimating lens.

25. The switch as recited in claim 21 wherein said primary refracting body is composed of glass.

26. The switch as recited in claim 21 wherein said frustrating refracting body is composed of glass.

27. The switch as recited in claim 21 wherein said actuator is composed of a piezoelectric bimorph.

28. The switch as recited in claim 21 wherein said mirror is composed of enhanced silver.

* * * * *

UNITED STATES PATENT AND TRADEMARK OFFICE
CERTIFICATE OF CORRECTION

PATENT NO. : 6,665,461 B1  
DATED : December 16, 2003  
INVENTOR(S) : Richard H. Laughlin It is certified that error appears in the above-identified patent and that said Letters Patent is hereby corrected as shown below:

<u>Column 3,</u>  
Line 15, "refract" should be -- refracting --.

<u>Column 8,</u>  
Line 58, "herein" should be -- wherein --.

Signed and Sealed this

Thirtieth Day of March, 2004

JON W. DUDAS  
*Acting Director of the United States Patent and Trademark Office*